(12) United States Patent
Hoefer et al.

(10) Patent No.: US 12,741,499 B2
(45) Date of Patent: Sep. 22, 2026

(54) VEHICLE MOTION CONTROL SYSTEM AND METHOD

(71) Applicant: MAGNA INTERNATIONAL INC., Aurora (CA)

(72) Inventors: Christoph Hoefer, Hargelsberg (AT); Anastasiia Galkina, Linz (AT); Michael Doppler, Linz (AT)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 19/212,994

(22) Filed: May 20, 2025

(65) Prior Publication Data

US 2025/0360768 A1 Nov. 27, 2025

Related U.S. Application Data

(60) Provisional application No. 63/650,099, filed on May 21, 2024.

(51) Int. Cl.
*B60G 17/016* (2006.01)
*B60G 17/018* (2006.01)

(52) U.S. Cl.
CPC ......... *B60G 17/016* (2013.01); *B60G 17/018* (2013.01); *B60G 2400/25* (2013.01); *B60G 2500/10* (2013.01); *B60G 2600/184* (2013.01); *B60G 2600/604* (2013.01); *B60G 2600/90* (2013.01)

(58) Field of Classification Search
CPC ................ B60G 17/016; B60G 17/018; B60G 2400/25; B60G 2500/10; B60G 2600/184; B60G 2600/604; B60G 2600/90
See application file for complete search history.

(56) References Cited

U.S. PATENT DOCUMENTS

| | | | |
|---|---|---|---|
| 6,105,420 | A | 8/2000 | Kimura |
| 8,938,333 | B2 | 1/2015 | Bose et al. |
| 9,102,209 | B2 | 8/2015 | Giovanardi et al. |
| 9,939,080 | B2 | 4/2018 | Alred et al. |
| 10,132,334 | B2 | 11/2018 | Whitby |
| 10,690,215 | B2 | 6/2020 | Sakka et al. |
| 10,696,336 | B2 | 6/2020 | Fahland et al. |
| 10,711,861 | B1 | 7/2020 | Kasprzak et al. |
| 10,746,235 | B2 | 8/2020 | Denninger et al. |
| 10,836,949 | B2 | 11/2020 | Van Oort et al. |
| 10,844,923 | B2 | 11/2020 | Inoue et al. |
| 10,923,260 | B2 | 2/2021 | Komori et al. |
| 10,995,816 | B1 | 5/2021 | Trauernicht et al. |

(Continued)

*Primary Examiner* — Toan C To

(74) *Attorney, Agent, or Firm* — DICKINSON WRIGHT PLLC

(57) ABSTRACT

An active suspension control system for a vehicle includes an unsprung mass coupled to a sprung mass by a spring, and an actuator disposed between the unsprung mass and the sprung mass and configured to apply a force therebetween. The active suspension control system also includes a controller in functional communication with the actuator. The controller is configured to cause the actuator to vary the application of the force based on a force command signal. The controller is configured to determine the force command signal based on at least one of: a linear quadratic control technique, or an impedance control technique that uses a low-pass filtered actual-value signal.

18 Claims, 14 Drawing Sheets

(56) References Cited

U.S. PATENT DOCUMENTS

| | | | | |
|---|---|---|---|---|
| 11,021,033 | B2 * | 6/2021 | Anderson | B60G 17/019 |
| 11,097,586 | B2 | 8/2021 | Bruno et al. | |
| 11,167,671 | B2 | 11/2021 | Plante et al. | |
| 11,338,637 | B2 | 5/2022 | Dhaens et al. | |
| 11,465,277 | B2 | 10/2022 | Plante et al. | |
| 11,584,184 | B2 | 2/2023 | Wang et al. | |
| 11,760,365 | B2 * | 9/2023 | Unger | B60G 17/06<br>280/5.515 |
| 11,813,915 | B2 | 11/2023 | Zhao et al. | |
| 11,850,905 | B2 * | 12/2023 | Anderson | B60G 17/019 |
| 12,179,539 | B2 * | 12/2024 | Anderson | B60G 17/015 |
| 12,472,791 | B2 * | 11/2025 | Furuta | B60G 17/0165 |
| 12,533,923 | B2 * | 1/2026 | Al Sakka | B60G 17/018 |
| 2015/0066295 | A1 * | 3/2015 | Kanda | B60G 17/01933<br>701/38 |
| 2015/0191067 | A1 * | 7/2015 | Liu | B60G 17/016<br>701/37 |
| 2015/0367702 | A1 * | 12/2015 | Kubota | B60G 17/0165<br>701/37 |
| 2017/0326936 | A1 * | 11/2017 | Saito | B60G 17/0161 |
| 2021/0291610 | A1 * | 9/2021 | Goto | B60G 17/06 |
| 2022/0134833 | A1 * | 5/2022 | Furuta | B60G 17/0165<br>701/37 |
| 2023/0100858 | A1 * | 3/2023 | Hirao | B60G 17/015<br>280/5.515 |
| 2024/0300275 | A1 * | 9/2024 | Anderson | H02K 7/14 |

* cited by examiner 10
20
22
BODY
WHEEL
WHEEL
LEFT TRACK
RIGHT TRACK
SP2

VEHICLE MOTION CONTROL SYSTEM AND METHOD

CROSS REFERENCE TO RELATED APPLICATIONS

This U.S. Non-Provisional Patent Application claims the benefit of and priority to U.S. Provisional Application Ser. No. 63/650,099 filed May 21, 2024, the entire disclosure of which is hereby incorporated by reference in its entirety.

FIELD

The present disclosure relates generally control of body motion in a motor vehicle, such as a passenger car or truck.

BACKGROUND

Many vehicles, such as passenger cars and trucks include active suspension systems capable of controlling body motion. Such active suspension systems may provide a variety of functions for vehicle dynamics control, and controlling components of an active suspension system can be complex.

SUMMARY

The present disclosure provides an active suspension control system for a vehicle. The active suspension control system includes an unsprung mass coupled to a sprung mass by a spring, and an actuator disposed between the unsprung mass and the sprung mass and configured to apply a force therebetween. The active suspension control system also includes a controller in functional communication with the actuator. The controller is configured to cause the actuator to vary the application of the force based on a force command signal. The controller is configured to determine the force command signal based on at least one of: a linear quadratic control technique, or an impedance control technique that uses a low-pass filtered actual-value signal.

The present disclosure also provides a method for controlling an active suspension control system for a vehicle. The method includes: applying a force, by an actuator, between an unsprung mass and a sprung mass; determining, by a controller, a force command signal based on at least one of: a linear quadratic control technique, or an impedance control technique using a low-pass filtered actual-value signal; and communicating the force command signal to the actuator to cause the actuator to vary the force. The unsprung mass is coupled to the sprung mass by a spring.

These and other aspects of the present disclosure are disclosed in the following detailed description of the embodiments, the appended claims, and the accompanying figures.

BRIEF DESCRIPTION OF THE DRAWINGS

Further details, features and advantages of designs of the invention result from the following description of embodiment examples in reference to the associated drawings.

DETAILED DESCRIPTION

Figures 1A, 1B:
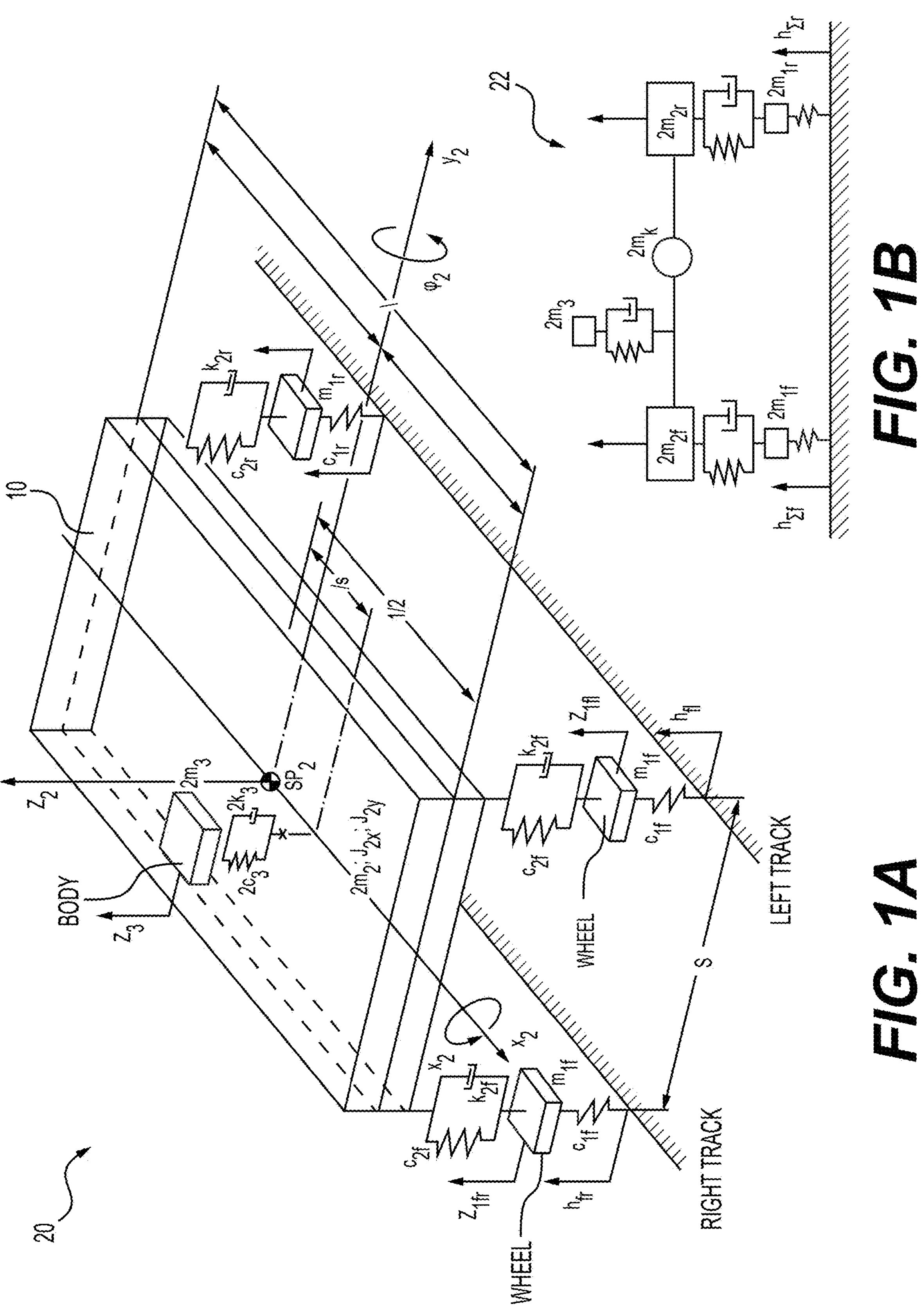
FIG. 1A shows a free body diagram of a vehicle with four wheels.
FIG. 1B shows a free body diagram of an axle of a vehicle and with two wheels.

Referring to the drawings, the present invention will be described in detail in view of following embodiments. Vehicle motion control is a multi-dimensional problem. Typical observed movements include: rotation about a longitudinal axis (roll), rotation about a lateral axis (pitch), and linear translation along a vertical axis (heave)

Residual vehicle movements, longitudinal, lateral and yaw, part of panel movement, are out of scope. The body and its tires represent a 5-mass system, defined by sprung and un-sprung masses. Using spring and damper properties tires are connected to the ground and body. FIGS. 1A-1B each show a 3-dimensional arrangement. FIG. 1B shows a first free-body diagram 20 illustrating forces acting on a vehicle 10 with four wheels, and FIG. 1B shows a second free-body diagram 22 illustrating forces acting on an axle with two wheels. As shown, m represents mass, c represents a spring constant, k represents a damping constant, and h represents a heave force, such as a force that may result from the vehicle 10 hitting a bump in the road surface. Subscripts f and r denoting front and rear, respectively. Generating the motion equations out of this system boundaries show the coupled movements between roll, pitch and heave.

Figure 2:
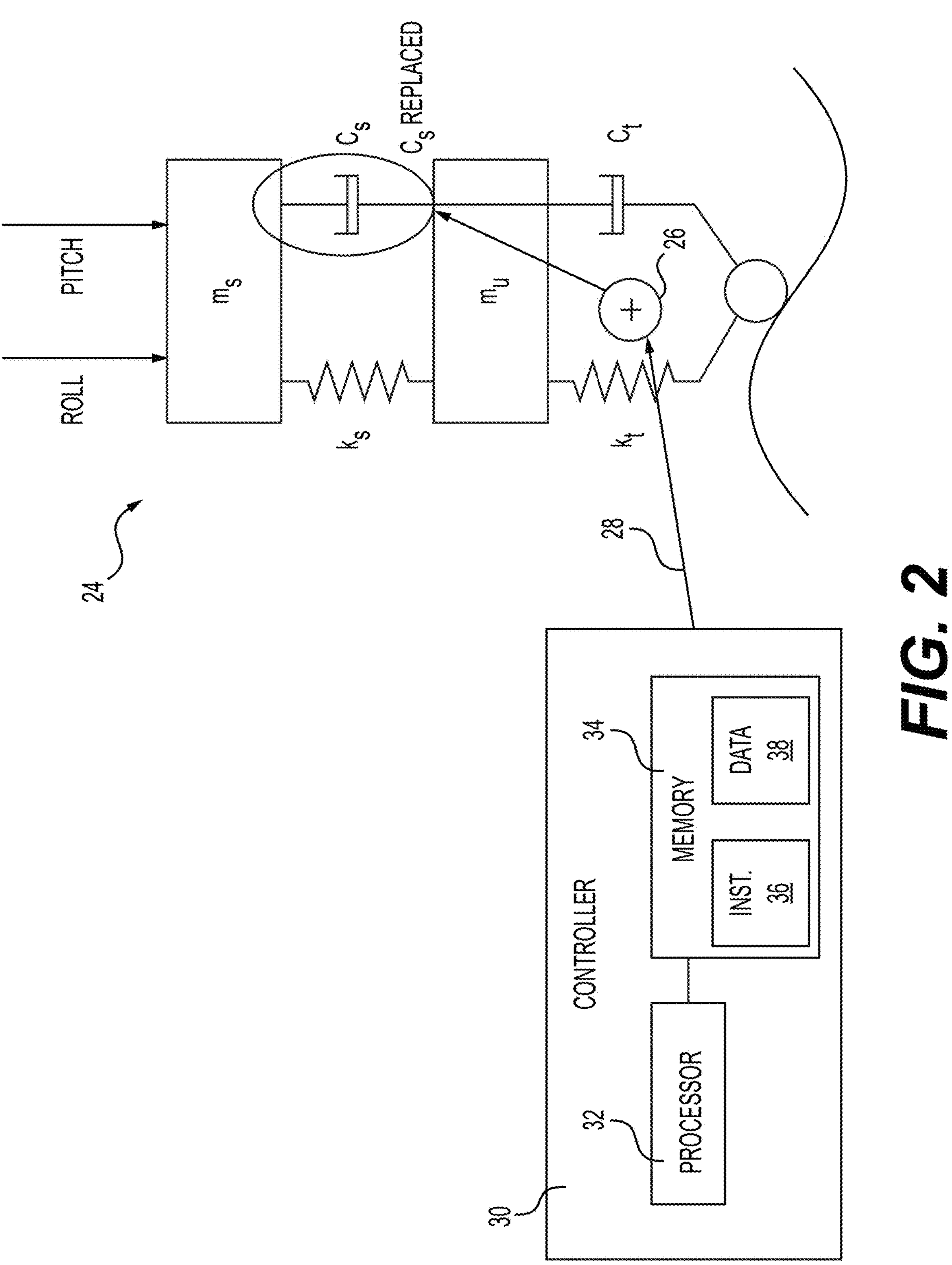
FIG. 2 shows a schematic diagram of a suspension assembly for one corner of a vehicle.

Using a magnetorheological fluid (MR) active suspension damper, or any other force-driven actuator, and replacing the damper coefficient by an actuator within the differential equation transforms the motion equation into a control system See FIG. 2.

FIG. 2 shows a schematic diagram of a suspension assembly 24 for one corner of a vehicle. The suspension assembly 24 includes an unsprung mass $m_u$. The unsprung mass may include a wheel and tire as well as other structural elements rigidly connected thereto, such as brake components, axle components, etc. The unsprung mass $m_u$ is connected to the road surface via spring $k_t$ and damper $c_t$, which may represent spring and damping effects of the tire.

The suspension assembly 24 also includes a sprung mass $m_s$. The sprung mass $m_s$ may include chassis and body components of the vehicle, as well as occupants of the vehicle. The unsprung mass $m_u$ is connected to the sprung mass $m_s$ by a physical spring $k_s$ and a damper $c_s$. During operation of the vehicle, the sprung mass $m_s$ is subjected to one or more forces, such as forces causing the vehicle to roll and/or pitch.

In some embodiments, an actuator 26 is used instead of the damper $c_s$. In other words, the actuator may be disposed between the unsprung mass and the sprung mass. The physical spring $k_s$ and the actuator 26 may be the only physical connections between the sprung mass and the unsprung mass. The actuator 26 may be configured to apply a force between the unsprung mass and the sprung mass. The actuator 26 may be used for one or more functions such as virtual frequency, ideal damping, roll compensation, and pitch compensation.

FIG. 2 also shows a controller 30 configured to send a force command signal 28 to the actuator 26. The controller 30 may include an electronic control unit (ECU). The controller 30 includes a processor 32 coupled to a storage memory 34. The storage memory 34 stores instructions, such as program code for execution by the processor 32, in an instruction storage 36. The storage memory 34 also includes data storage 38 for holding data to be used by the processor 32. The data storage 38 may record, for example, values of the parameters measured by one or more sensors and/or the outcome of functions calculated by the processor 32.

Figures 3, 4:
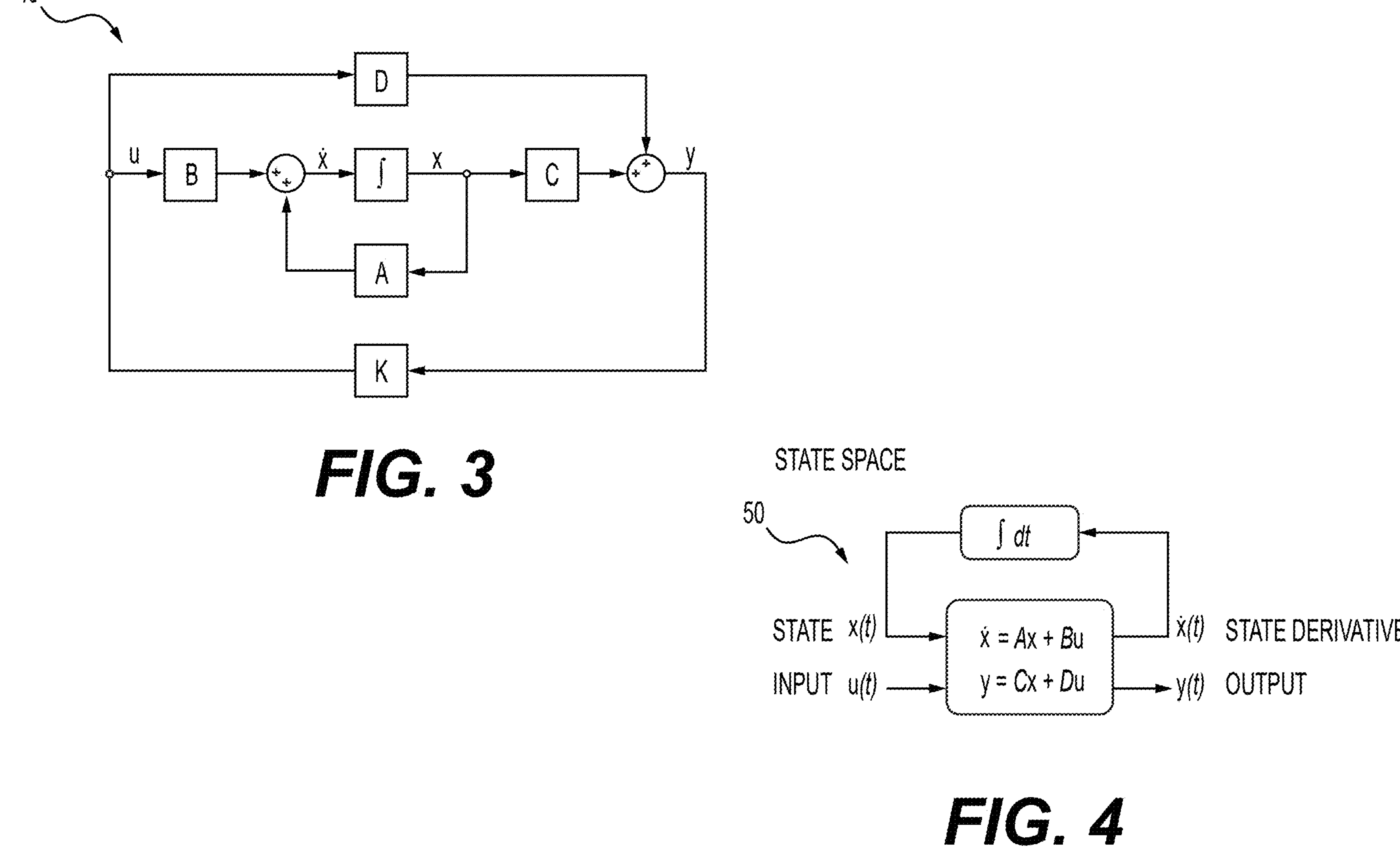
FIG. 3 shows a block diagram of a linear quadratic controller implementing a state space model with a collection of coupled linear first-order differential equations.
FIG. 4 shows a block diagram of a state space model.

FIG. 4 shows a block diagram of a state space model 50, and FIG. 3 shows a block diagram of a linear quadratic controller 40 implementing a state space model with a collection of coupled linear first-order differential equations. The state space model 50 take input signals u, which may also be represented as an input as a function of time u(t) and to determine an output signal y, which may also be represented as a function of time y(t). The state space model 50 determines and maintains states x, which may also be represented as a function of time x(t). The state space model 50 also determines and maintains state derivatives $\dot{x}$ which may also be represented as a function of time $\dot{x}(t)$. The state space model 50 includes several matrices A, B, C, D. The mathematical representation of the model is shown on FIG. 10. C is a 14×14 unit matrix and D is 14×14 zero matrix. Together, they enable the state space model 50 to compute the output signal y based on the input signals u.

Inputs to the state space model 50 include forces on each of four corners between the un-sprung mass and the sprung mass. Input signals to a control system may include body motion angles and distances, such angles of roll and pitch and a heave distance.

The present disclosure provides an optimal linear quadratic controller 40 based on the full vehicle state space model 50 or impedance controller 100 to determine force commands for the actuators 26, based on the input signals.

Figures 5A, 5B:
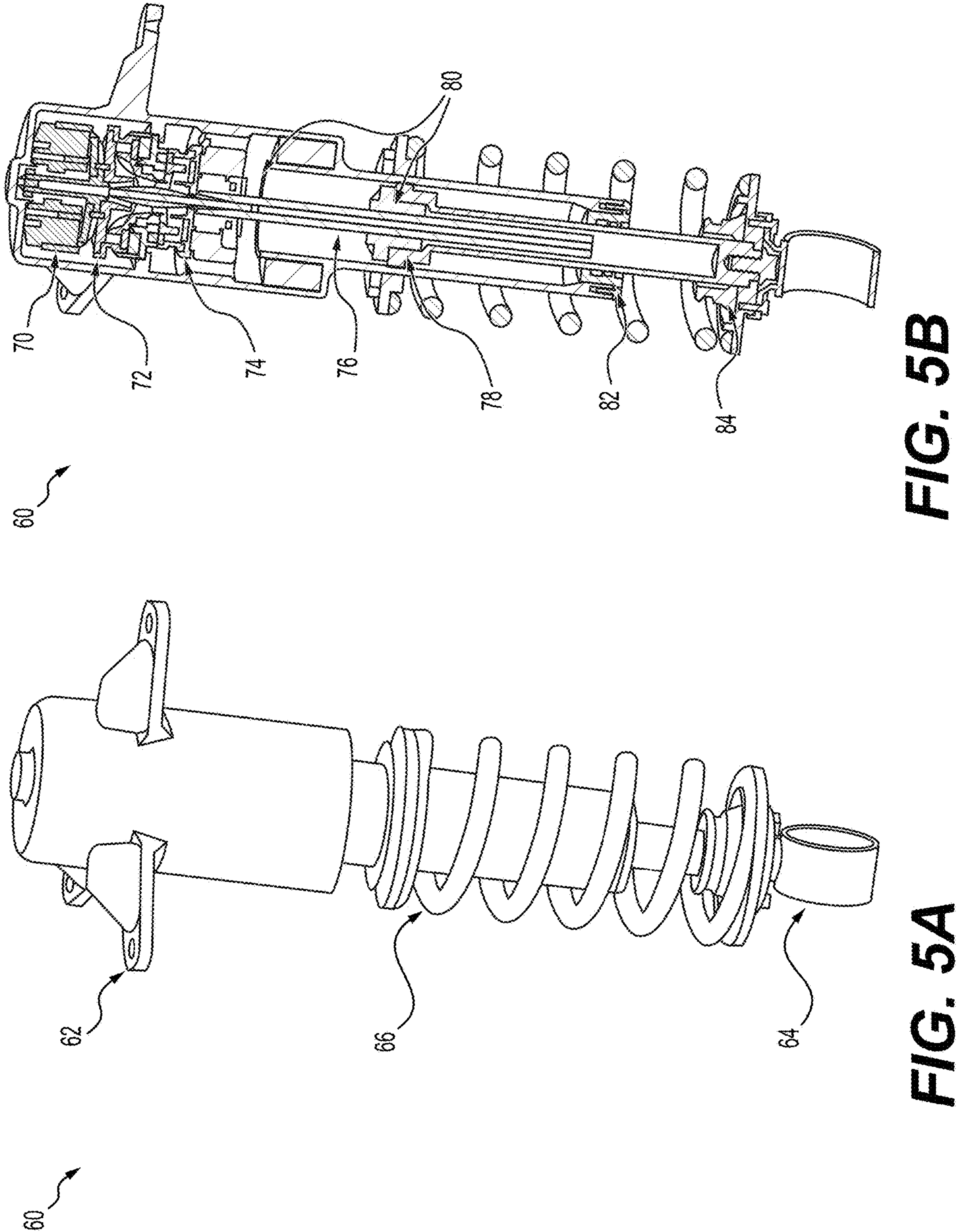
FIGS. 5A-5B each show an active strut of a suspension system for one corner of a vehicle.

FIGS. 5A-5B each show an active strut 60 of a suspension system for one corner of a vehicle. The active struts 60 may be used as the actuator 26 and the physical spring $k_s$. The active strut 60 includes a top interface 62 that is configured to mount to a body structure of the vehicle, and a bottom interface 64 that is configured to attach to the unsprung mass. The active strut 60 also includes a coil spring 66 connected between the top interface 62 and the bottom interface 64, and which may function as the physical spring $k_s$.

As shown in FIG. 5B, the active strut 60 includes one or more active devices 70, 72, 74 which may be used together or independently to apply a force between the top interface 62 and the bottom interface 64. In other words, any or all of the active devices 70, 72, 74 may function as the actuator 26. The active devices 70 include a motor 70, such as an alternating current (AC) motor, located in the top interface 62 and configured to apply a linear force between the between the top interface 62 and the bottom interface 64 by turning a ball screw 76 that interacts with a recirculating ball nut 78 that is coupled to the bottom interface 64. A magnetorheological (MR) clutch 72 selectively couples a shaft of the motor 70 with the ball screw 76 for controlling transmission of torque therebetween. An MR brake 74 is coupled to the ball screw 76 for selectively applying a braking force thereto. The active strut 60 also includes one or more rod guides 80 for holding and guiding the ball screw 76, and a sealing unit 82 having wiper seal and a rod seal. The active strut 60 also includes a bump stop 84 for limiting travel at a full compressed position.

The active strut 60 is one example of a device that may be used as the actuator 26. However, the actuator 26 may include one or more other types of devices, which may include one or more hydraulic, pneumatic, and/or electrically actuated components.

Figure 6:
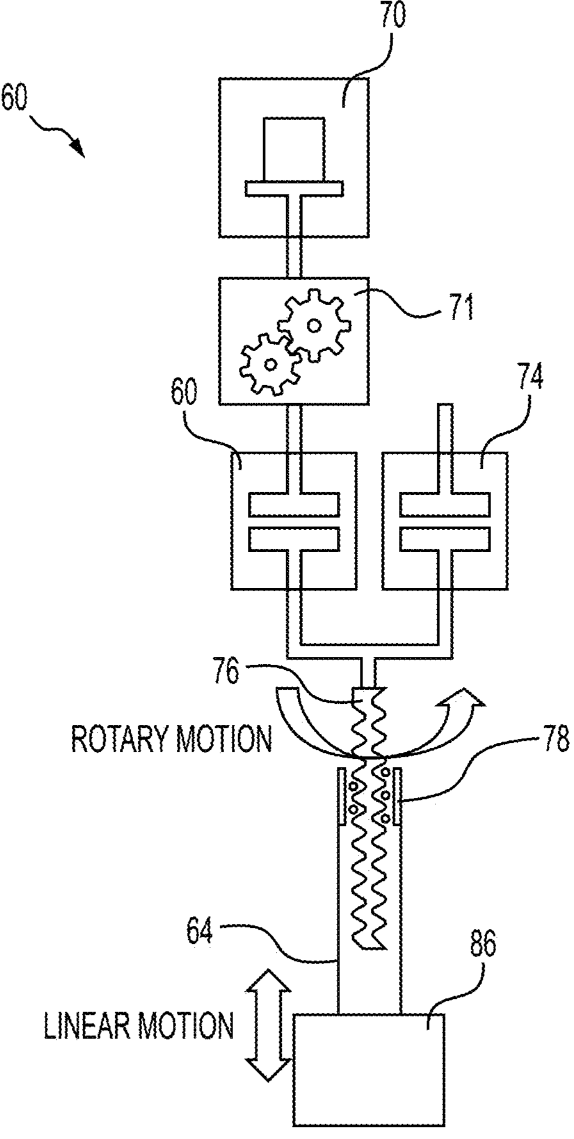
FIG. 6 shows a schematic diagram of a suspension system for one corner of a vehicle, and including the active strut of FIGS. 3A-3B.

FIG. 6 shows a schematic diagram of a suspension system for one corner of a vehicle, and including the active strut 60. As shown in FIG. 6, the motor 70 is coupled to the ball screw 76 via a reduction gear 71 and the MR clutch 72 for transmitting torque therebetween. The ball nut 78 is connected to a steering knuckle 86 via the bottom interface 64 for transmitting linear vertical force therebetween. The ball screw 76, in combination with the ball nut 78 converts rotary torque into linear force. The steering knuckle 86 may connect to the first mass m1 (aka the unsprung mass).

The processor 32 may execute instructions to implement the linear quadratic controller 40 or impedance controller 100 to generate the force command signal 28 for causing the actuator 26 to apply a corresponding force.

The state space model 50 with states x including all 4 knuckles (vertical motion) and body (vertical, roll, pitch) is used to generate a feedback matrix K for the linear quadratic controller 40. The state space model 50 may be used only for design purposes and may have no use in operating the linear quadratic controller 40. Having conditioned matrices for such suspension control systems using active strut 60 is identified as new. As actors (see u in state space) in the system forces are applied between body and knuckle. Further details of actuation are moved into the smart-actuator part itself, to keep a split between high-level and low-level control. Thus, the system and method of the present disclosure may clearly separate vertical vehicle motion control from active suspension control unit (low level).

Applying optimal control theory on this state space formulation provides matrices Q & R. Whereas Q is penalizing the error and R is penalizing the effort. Tuning matrices Q and R are tuned manually considering reduction of state oscillations by means of reducing heave, roll and pitch rates. For this purpose, different states in Q and R matrix must be weighted in such a way that the oscillations are absorbed by active strut 60. Solving this control problem may require all states. Sensor values can be used from the vehicle like inertia measuring unit, acceleration at each corner, level sensors etc. Typically, a minimum set on hardware sensors is used, for cost reason, where the residual values (incl. their derivatives) are modelled using observers.

The road and vehicle excite a certain motion, which is detected by physical and virtual sensors. Using the described control algorithm results in counter measures at each corner of the vehicle. Examples of parameters that can be defined include: tilt angle of the body to reduce subjective lateral acceleration; and/or heave acceleration/vibration to increase comfort.

The system and method of the present disclosure may provide several advantageous features, such as Discomfort reduction; Better ingress/egress by car levelling; Vehicle level weight reduction; Vehicle level cost reduction; Improved safety & dynamics (individual tire force); and potential increase in range (e.g. as a result of reducing drag at highway speeds).

Impedance Control Application on Vehicle Motion Control

In some embodiments, vehicle motion control can be separated into high level and low-level control. Force is defined as interface between sprung and un-sprung mass, beside remaining base spring. Choosing the corner approach all equations are concentrated on the quarter car model. This requires pitch and roll to be considered separately, as these movements originate beyond system boundaries.

Figure 7:
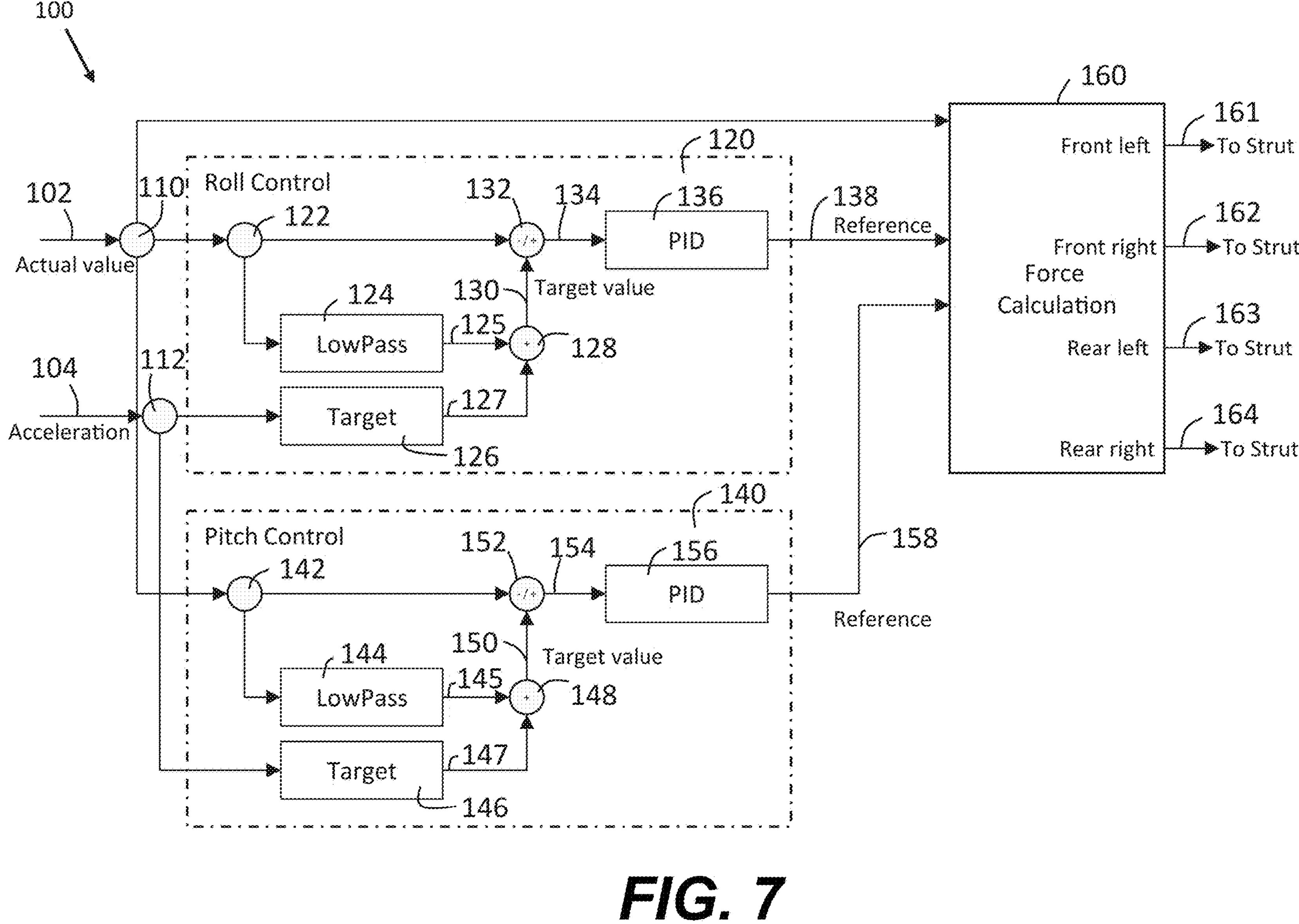
FIG. 7 shows a schematic block diagram of an impedance controller for an active suspension system.

FIG. 7 shows a schematic block diagram of a suspension controller 100 for an active suspension system and to implement such an impedance control technique. The suspension controller 100 takes, as inputs, an actual value signal 102 and an acceleration signal 104. The actual value signal 102 may represent a position of the suspension actuator 26. The suspension controller 100 includes a roll controller 120 configured to generate a roll-control reference signal 138 for controlling roll of the vehicle. The suspension controller 100 also includes a pitch controller 140 configured to generate a pitch-control reference signal 158 for controlling pitch of the vehicle. The suspension controller 100 also includes a force calculator 160 configured to generate force control signals 161, 162, 163, 164 based on the roll-control reference signal 138 and the pitch-control reference signal 158 and for controlling respective actuators 26 at each of four corresponding corners of the vehicle. The force control signals 161, 162, 163, 164 may each include a corresponding force command signal 28.

The suspension controller 100 also includes a first multiplexer 110 configured to send the actual value signal 102 to each of the roll controller 120, the pitch controller 140, and the force calculator 160. The suspension controller 100 also includes a second multiplexer 112 configured to send the acceleration signal 104 to each of the roll controller 120 and the pitch controller 140.

The roll controller 120 includes a third multiplexer 122 configured to send the actual value signal 102 to each of a first low-pass filter 124 and a first subtractor 132. The roll controller 120 also includes a first low-pass filter 124 configured to generate a first low-pass signal 125. The roll controller 120 also includes a first target calculator 126 configured to determine a first target value 127 based on the acceleration signal 104. The roll controller 120 also includes a first adder 128 configured to add the first low-pass signal 125 to the first target value 127 and to determine a roll target value 130. The roll controller 120 also includes a first subtractor 132 configured to subtract the actual value signal 102 from the roll target value 130 to determine a roll difference signal 134. The roll controller 120 also includes a first proportional-integral-derivative (PID) controller 136 configured to compute the roll-control reference signal 138 based on the roll difference signal 134.

The pitch controller 140 includes a fourth multiplexer 142 configured to send the actual value signal 102 to each of a second low-pass filter 144 and a second subtractor 152. The pitch controller 140 also includes a second low-pass filter 144 configured to generate a second low-pass signal 145. The pitch controller 140 also includes a second target calculator 146 configured to determine a second target value 147 based on the acceleration signal 104. The pitch controller 140 also includes a second adder 148 configured to add the second low-pass signal 145 to the second target value 147 and to determine a pitch target value 150. The pitch controller 140 also includes a second subtractor 152 configured to subtract the actual value signal 102 from the roll target value 130 to determine a pitch difference signal 154. The pitch controller 140 also includes a second proportional-integral-derivative (PID) controller 156 configured to compute the pitch-control reference signal 158 based on the roll difference signal 154.

The suspension controller 100 may also be called an Impedance Controller (IPC), and may define required strut force on each corner module to compensate: pitch angle and roll angle and to manipulate: eigenfrequency and deal damping. A physical spring $k_s$(e.g.: air, coil, or similar) is present at the corner module (such as the suspension assembly 24), the legacy damper component is replaced by a force actuator, such as the active strut 60 or another actuator device.

Introducing a virtual spring parallel to the physical spring $k_s$ changes the eigenfrequency of the system. Challenging the virtual spring property to a, e.g.: negative, value results in shifting the first mode to lower frequency levels. Vice versa, a target frequency provides the virtual spring stiffness. Extreme value could be defining the virtual spring to the negative value of the physical spring. Using the real displacement and virtual spring stiffness provides first portion of force-actuator.

Ideal damping may be handled by calibrated values, by maps, curves or scalars, and real velocities.

An overall target of the suspension controller 100 may be "no disturbances", neither in low frequency range nor in high. Therefore, a lowpass filter is used to generate an according target value for a control. Providing the possibility to reduce road noise, tire amplification or other input. Representing the low frequency range, a target value is calculated from panel movement input, representing yaw, lateral and longitudinal. High and low frequency targets together represent the reference value, which compared to the actual value, provides the input to a state-of-the-art PID control. The output of this control is in dimension of the pitch and roll. Parameters of control are calibrated using standard methods.

The force calculator 160 may perform a last step, combining all single demands per corner to generate a target force to the strut. Using a quarter car model differential equation. Considering actual and target values on physical and virtual spring provide an easy and fast approach. Each corner may perform a superposition of the force components. The output of the functions therefore provides a target force for each strut.

Figure 8:
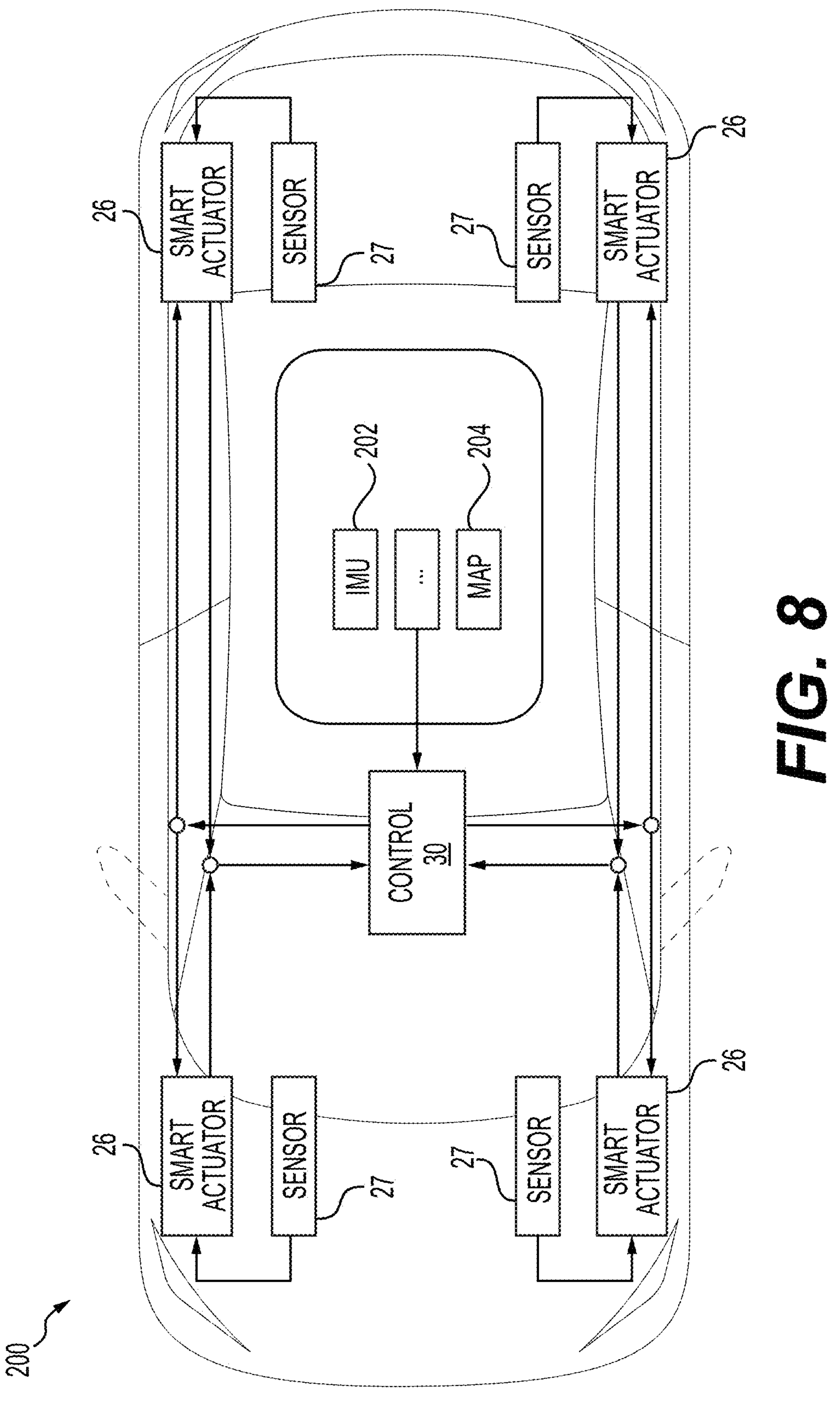
FIG. 8 shows a schematic diagram showing communications interconnections between components of an active suspension control system in a vehicle.

FIG. 8 shows a schematic diagram of a vehicle 10 showing communications interconnections between components of an active suspension control system 200 in the vehicle 10. The active suspension control system 200 includes the controller 30 in communication with actuators 26 at each of four corners. A sensor 27, such as a suspension height sensor, is also located at each of the four corners and in functional communication with the controller 30. The sensor 27 may be configured to measure a linear distance between the first mass m1 and the second mass m2, which may represent a degree of compression of the corresponding actuator 26.

An inertial measurement unit (IMU) 202 is in functional communication with the controller 30 for measuring rotations and accelerations in one or more dimensions. A map 204 of values, such as operating and tuning parameters is also in functional communication with the controller. In some embodiments, the active suspension control system 200 may include no force sensor directly measuring force suspension components at the corners.

Figure 9A:
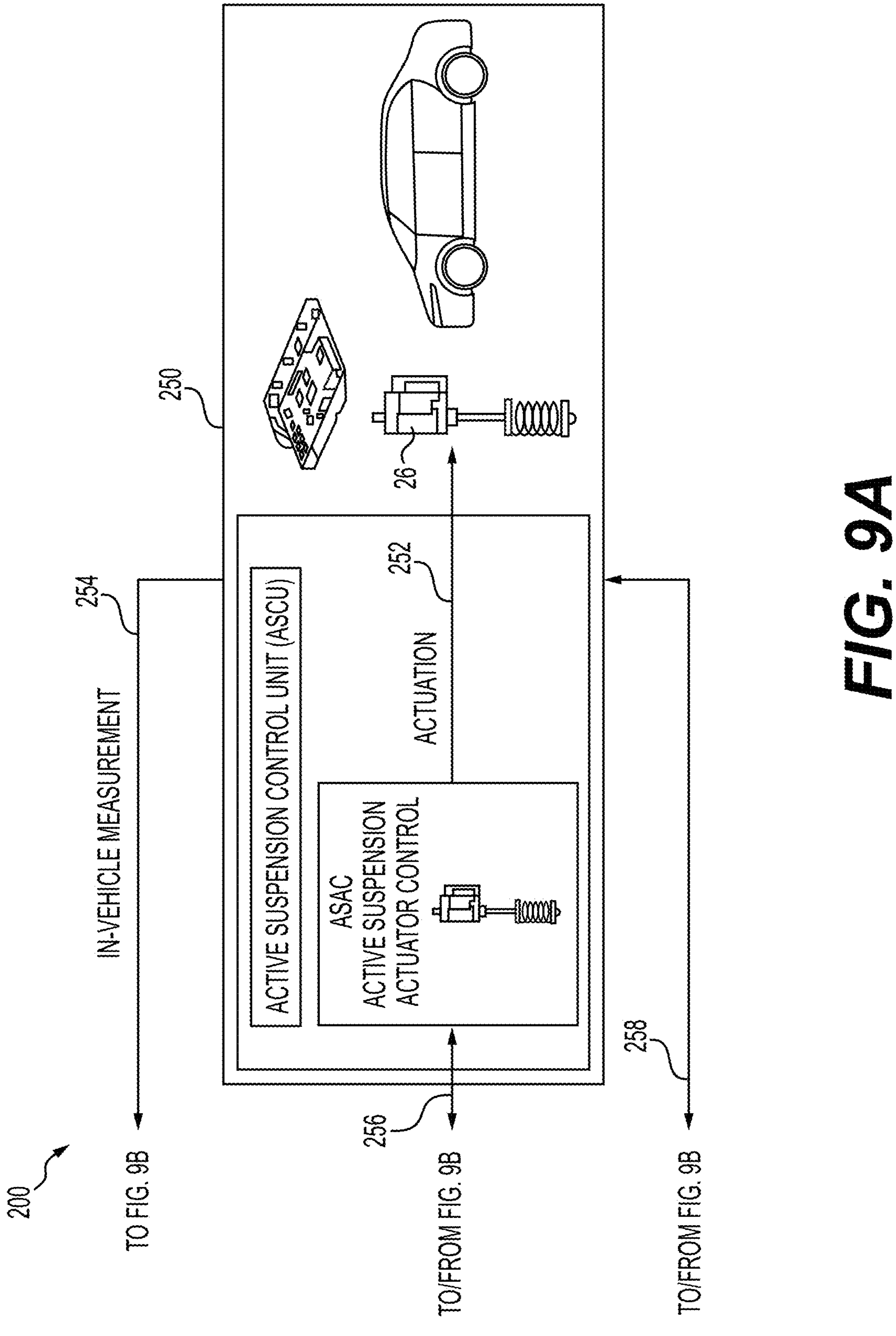
FIGS. 9A-9B show a high-level block diagram of the active suspension control system of the present disclosure.
Figure 9B:
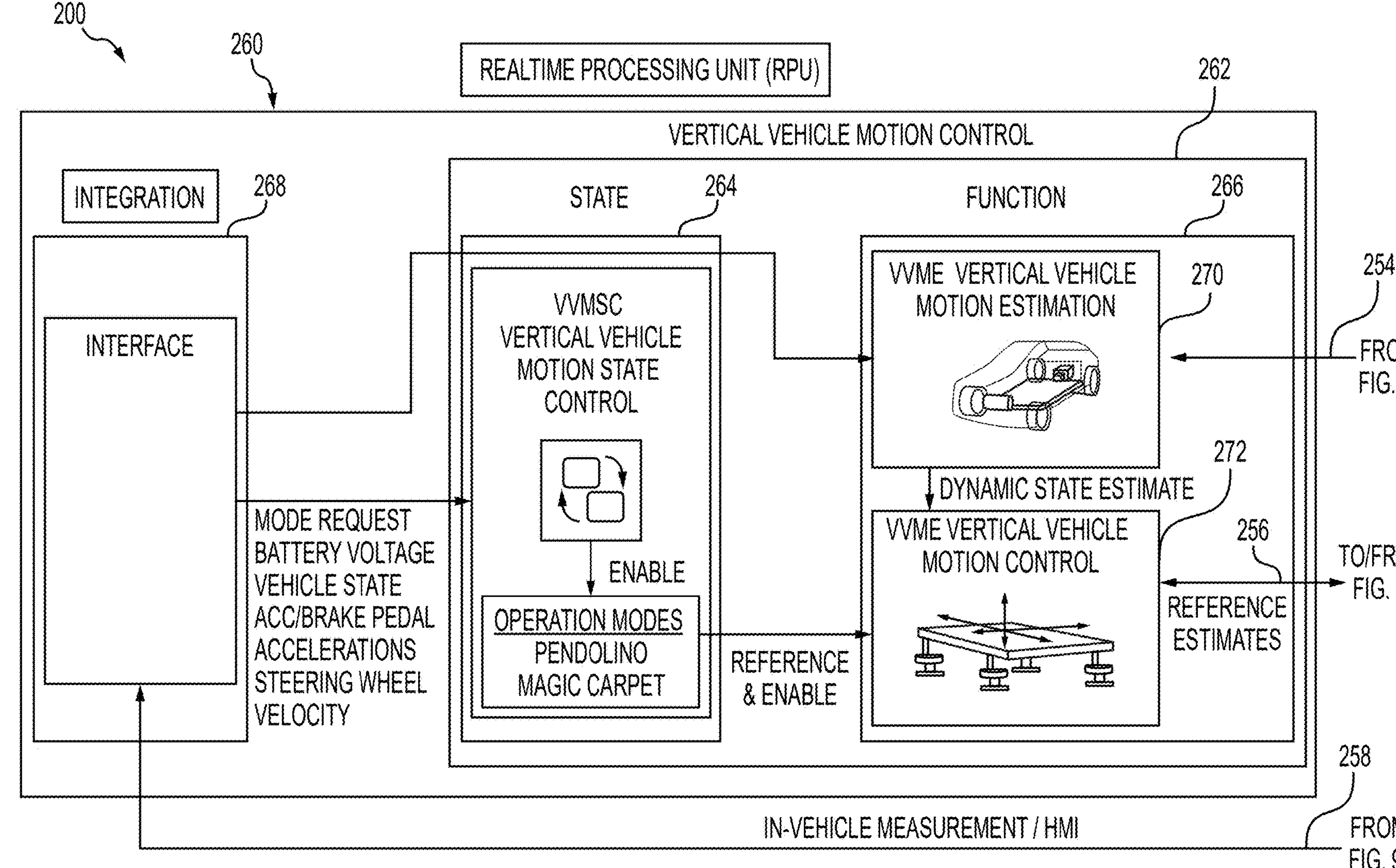

FIGS. 9A-9B show a high-level block diagram of the active suspension control system 200 of the present disclosure. As shown, the system 200 includes an active suspension control unit 250 configured to send an actuation signal 252 to each of the actuators 26.

The system 200 also includes a realtime processing unit (RPU) 260. The RPU 260 includes a vertical vehicle motion controller 262 for performing realtime control. The vertical vehicle motion controller 262 includes a state controller 264 and a function controller 266. The active suspension control unit 250 is also configured to send in-vehicle measurement signals 254 to the RPU 260. The active suspension control unit 250 is also configured to send and receive reference estimate data 256 and measurement and configuration data 258.

The state controller 264 is configured to perform vertical vehicle motion state control and to operate in one or more operation modes, such as pendolino control and Magic Carpet mode. The function controller 266 includes a vertical vehicle motion estimator 270 that is configured to generate a dynamic estimate of vertical vehicle motion using the in-vehicle measurement signals 254 from the active suspension control unit 250. The function controller 266 also includes a vertical vehicle motion controller 272 that is configured to send and receive the reference estimate data 256.

Figure 10:
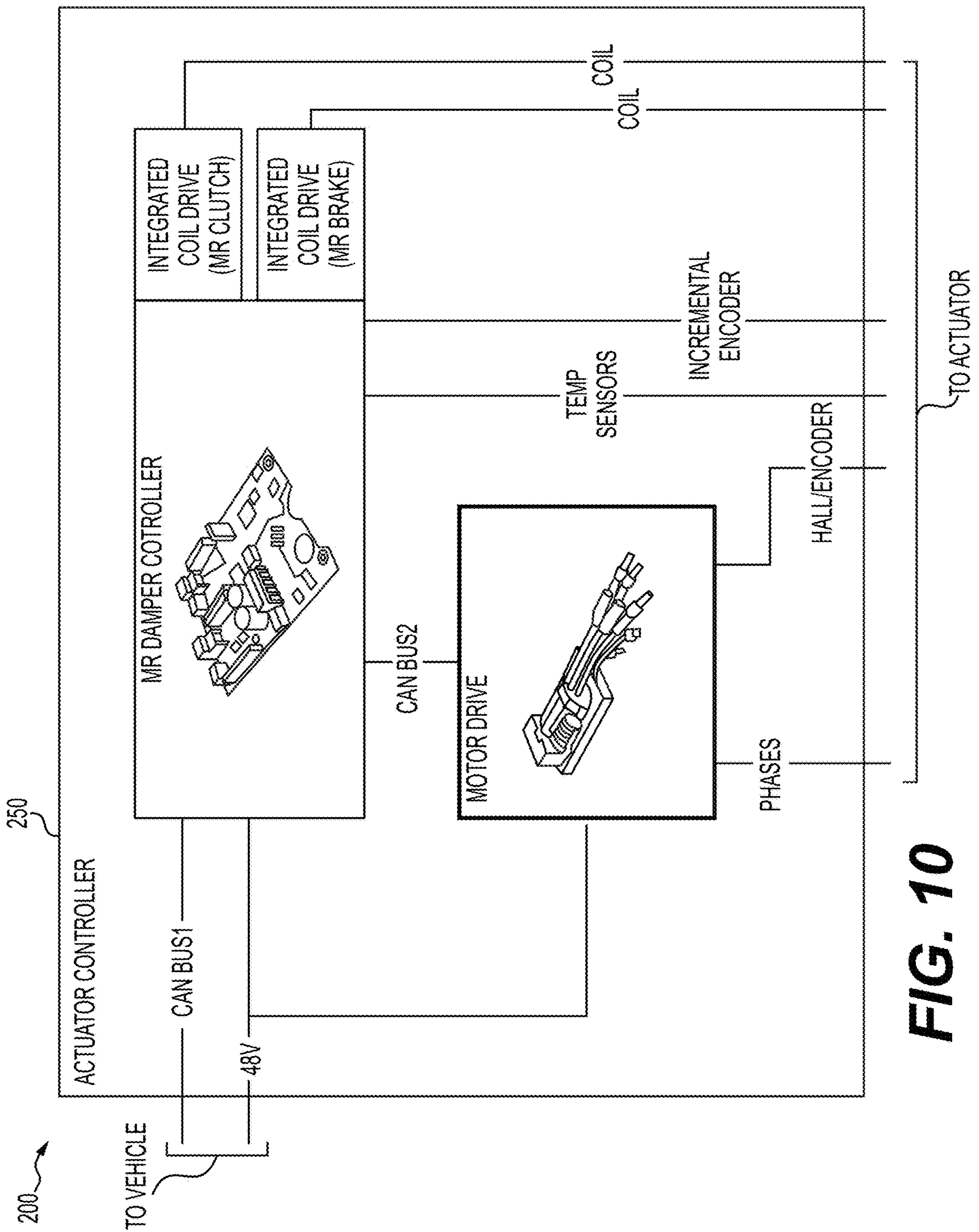
FIG. 10 shows a block diagram of an active suspension actuator control system of the present disclosure.
Figure 11:
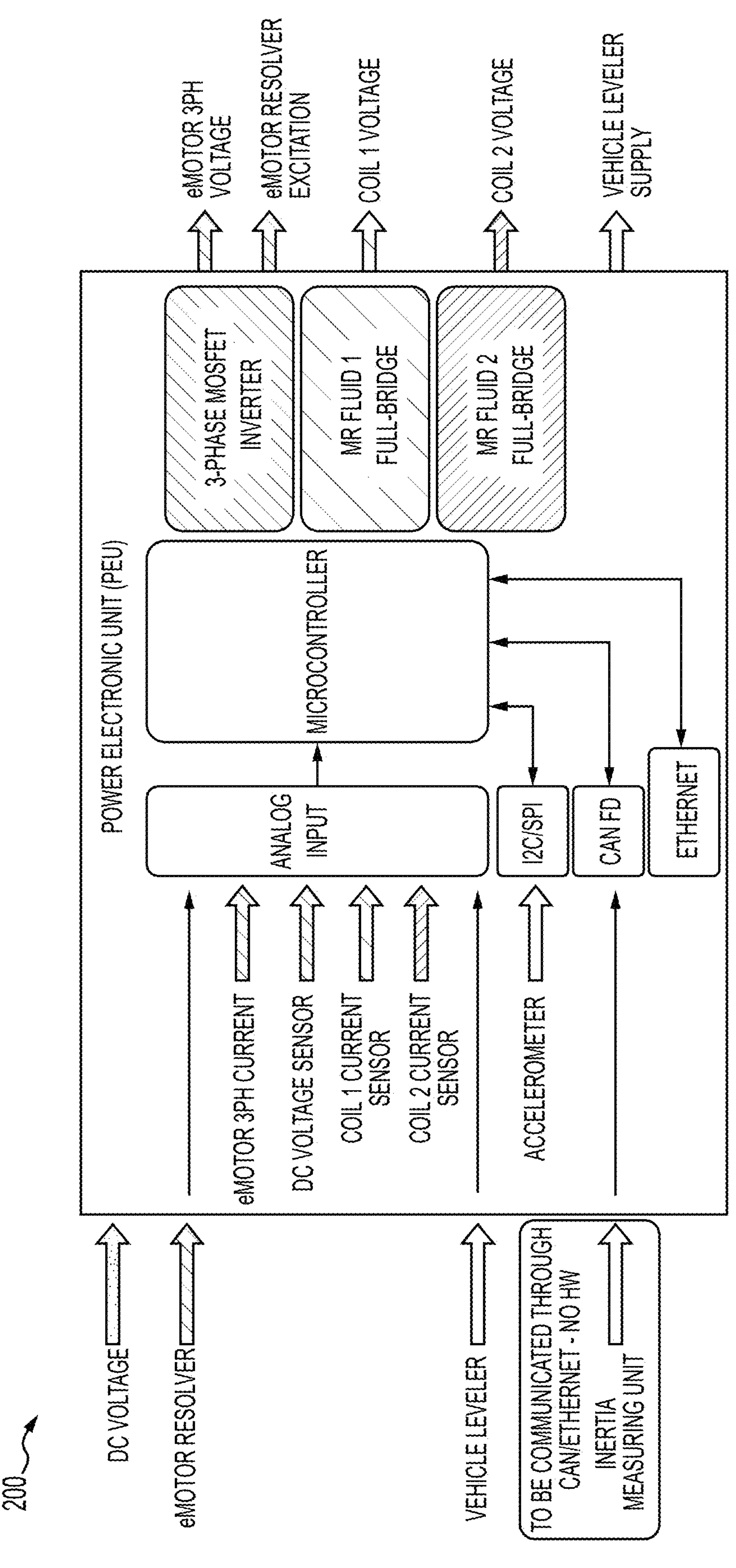
FIG. 11 shows a block diagram of electronics components in an active suspension control system of the present disclosure.
Figure 12:
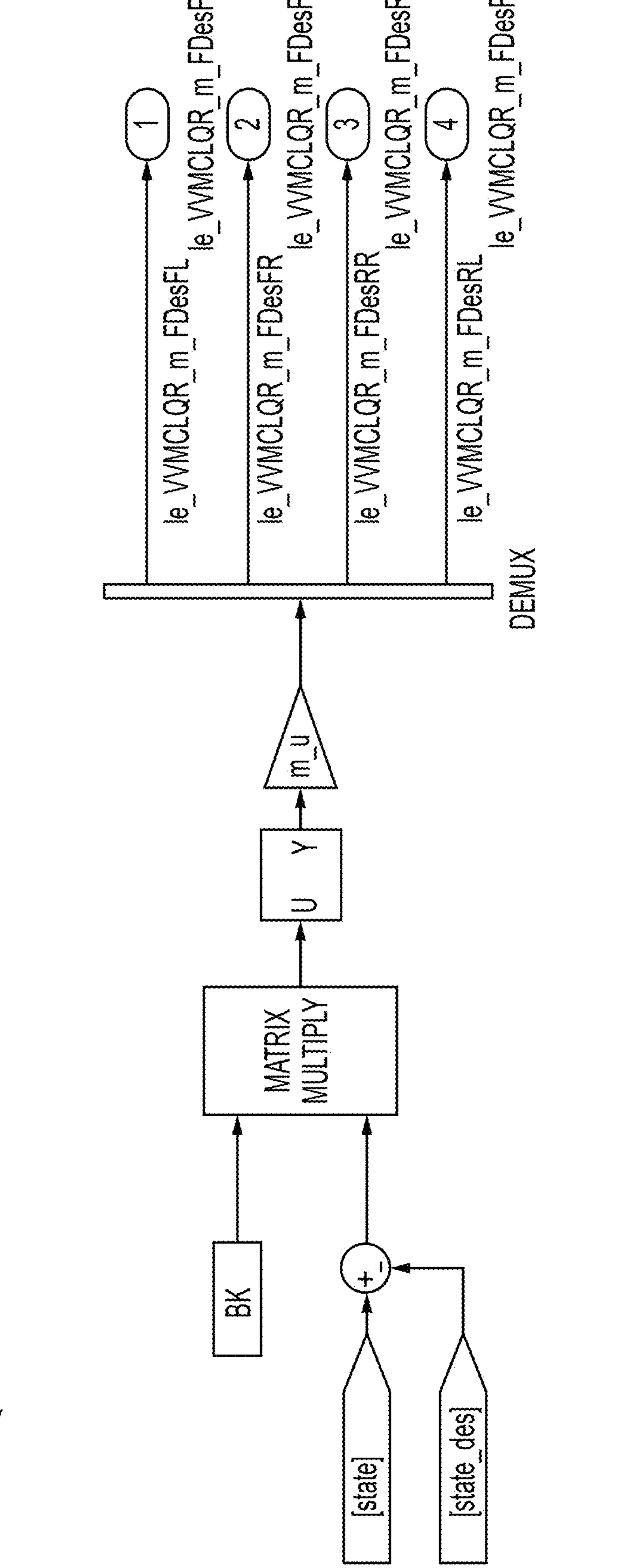
FIG. 12 shows a schematic diagram of linear quadratic controller for an active suspension system.

FIG. 10 shows a block diagram of an active suspension actuator control system of the present disclosure. FIG. 11 shows a block diagram of electronics components in an active suspension control system of the present disclosure. FIG. 12 shows a schematic diagram for the active optimal quadratic suspension control system of the present disclosure, configured for clustering vehicle functions.

The optimal quadratic control 200 is based on the full vehicle model and represents a state feedback control with the feedback matrix K. K matrix may be calculated based on the tuning matrices Q and R. Also, K matrix can be calculated based on the state space controller parameterization by direct allocation of the state controller poles. The system 200 may be configured to cluster vehicle functions and to provide holistic control for one or more functions. The system 200 may provide functions including, for example: Active damping; Active suspension (active spring stiffness, virtual spring stiffness); Height control (dynamic height adjustment); Anti-dive (pitch control) and anti-squat function; Roll control (pendolino); Vertical level control (as result of motion control during driving); Adaptation to driving conditions; Load balancing; Vehicle stabilization, ADAS Sensors Stabilization/Perception Improvement. Additionally or alternatively, the system 200 may enable Vehicle level (static, initial), such as Entry comfort function, and/or Height control. Additionally or alternatively, the system 200 may enable Emergency functionality which may be triggered, for example, by a Crash, ESP or ABS event. Such emergency functionality may include Pre-Impact control (side, front) and/or Tire contact optimization. In some embodiments, the system 200 may provide a virtual bump stop, which may be adjustable in location and in stiffness. The optimal quadratic control 200 requires all 7 absolute states and their rates to be known. Typically, only a few sensors are used, for example relative displacement between sprung and unsprung, as well as pitch and roll rate. To estimate all other states, Vertical Vehicle Motion Estimation (VVME) 200 is implemented in the form of Kalman Filter or Luenberger Observer. An L matrix may be calculated using tuned Q and R matrices of a Kalman Filter. The Kalman Filter may be designed based on the state space model 50.

The system 200 of the present disclosure may provide several different functions and advantages including: Superior primary and secondary ride; Reduced motion sickness/driver fatigue; Maintenance free, 'Dry' system (sustainability); Act as stabilizer bar (roll movement mitigation); and/or Higher off-road mobility.

The system 200 of the present disclosure may include one or more actuators 26 that are highly backdrivable (<1%), very low inertia and impeccable force tracking (~100 Hz). The actuators 26 may be Pure force source actuator. The system 200 of the present disclosure may provide Roll and pitch control (primary ride) and may reduce or eliminate bumps and vibrations (secondary ride). It may provide Negligible NVH. In some embodiments, no force sensors may be required. The system 200 of the present disclosure may enable regenerative damping and end customer features.

Figure 13:
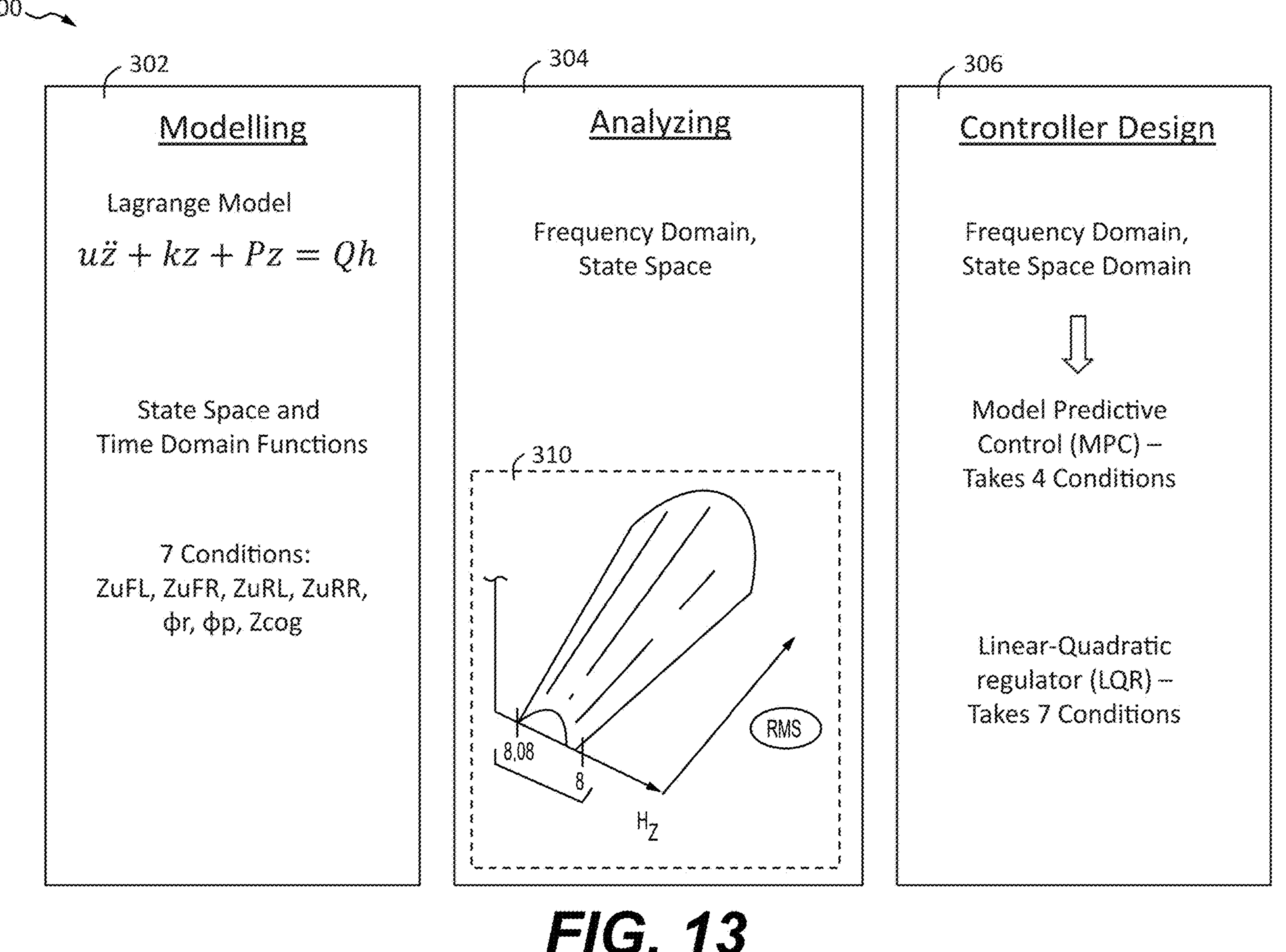
FIG. 13 shows an overview diagram illustrating a control technique of the present disclosure.

FIG. 13 shows an overview diagram illustrating a control technique 300 of the present disclosure. The control technique includes three main stages 302, 304, 306 including modeling 302, analyzing 304 and controller design 306. Modeling may include using a Lagrange model $u\ddot{z}+kz+Pz=Qh$ and state space and time domain functions of seven conditions. The seven conditions may include vertical displacement at each of four corners (ZuFL, ZuFR, ZuRL, ZuRR), as well as roll angle $\varphi_r$, pitch angle $\varphi_p$, and vertical displacement of the center of mass of the vehicle Zcog (i.e. heave). The analyzing phase 304 may include determining frequency domain and/or state space modeling data. The analyzing phase 304 may include generating one or more maps 310 representing the data. The controller design stage 306 may include using the frequency domain and state space domain data and may include using model predictive control (MPC) and/or a Linear-Quadratic regulator (LQR) to relate the seven conditions to determine output signals for controlling the actuators 26. The LQR, which may also be called a linear quadratic controller, may use matrices A and B for determining the output signals for controlling the actuators 26.

The linear quadratic controller may operate in accordance with the following equations:

$$\dot{x} = Ax + Bu$$

$$x = \left[z, \dot{z}, \varphi, \dot{\varphi}, \theta, \dot{\theta}, z_1, \dot{z}_1, z_2, \dot{z}_2, z_3, \dot{z}_3, z_4, \dot{z}_4\right]$$

The linear quadratic controller includes matrices A and B, which may include values for: Inertias (mass, sprung, unsprung, roll, pitch), Stiffness (tire, suspension), Damping (tire, suspension), Geometry (trackwidth, wheelbase), and/or Ratio (centre of gravity, suspension).

A Q matrix may be used for tuning the linear quadratic controller, according to an aspect of the present disclosure.

An observer parametrized by a Kalman Filter may be used to perform Vertical Vehicle Motion Estimation (VVME), according to an aspect of the present disclosure.

Figure 14:
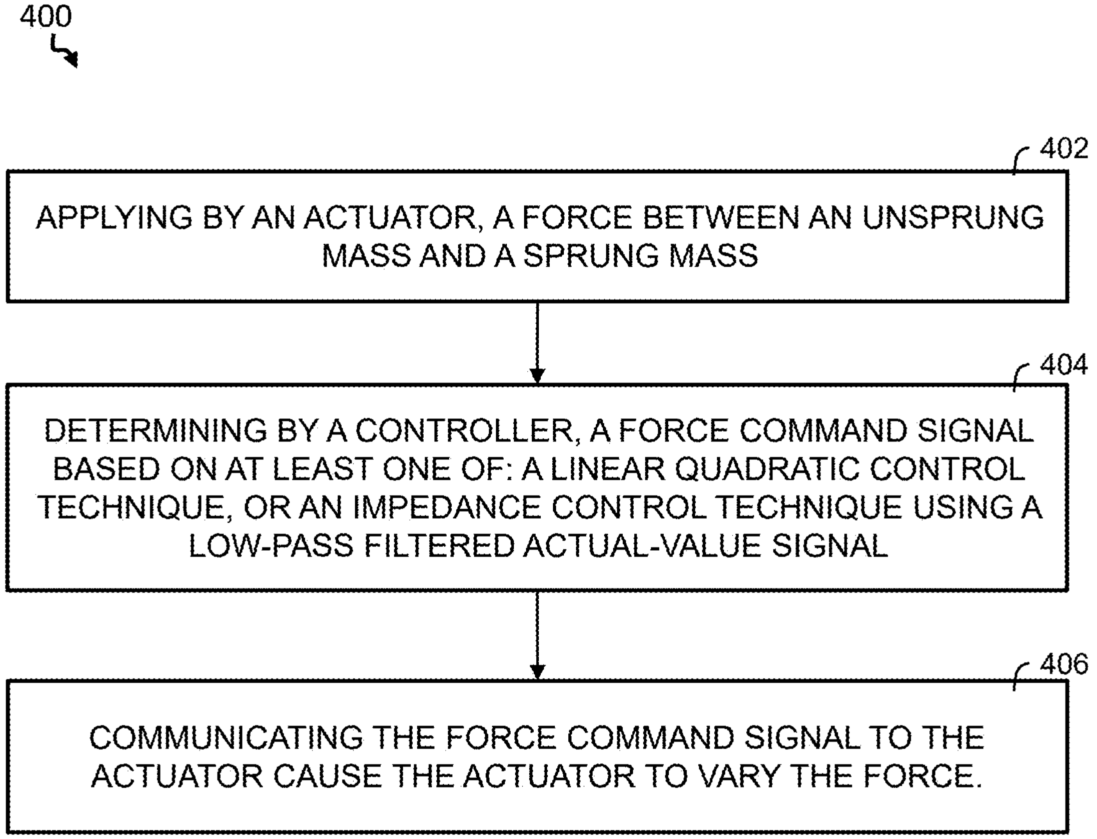
FIG. 14 shows a flow chart listing steps in a method for controlling an active suspension control system for a vehicle.

A method 400 for controlling an active suspension control system for a vehicle is shown in the flow chart of FIG. 14. The method 400 can be performed by the suspension assembly 24, including the controller 30, in accordance with some embodiments of the present disclosure. As can be appreciated in light of the disclosure, the order of operation within the method is not limited to the sequential execution as illustrated in FIG. 14, but may be performed in one or more varying orders as applicable and in accordance with the present disclosure.

The method 400 includes applying by an actuator, at step 402, a force between an unsprung mass and a sprung mass. The unsprung mass may be coupled to the sprung mass by a spring.

The method 400 also includes determining by a controller, at step 404, a force command signal based on at least one of: a linear quadratic control technique, or an impedance control technique using a low-pass filtered actual-value signal.

The method 400 also includes communicating, at step 406, the force command signal to the actuator to cause the actuator to vary the force.

In some embodiments, the controller is configured to determine the force command signal based on the linear quadratic control technique.

In some embodiments, the controller is configured to determine the force command signal based on the impedance control technique using the low-pass filtered actual-value signal.

In some embodiments, actual-value signal represents a linear distance between the unsprung mass and the sprung mass.

In some embodiments, the spring and the actuator are the only physical connections between the sprung mass and the unsprung mass.

In some embodiments, the unsprung mass includes a wheel of the vehicle.

In some embodiments, the vehicle includes a plurality of wheels, wherein the actuator is one of a plurality of actuators, with each actuator of the plurality of actuators being coupled to a corresponding wheel of the plurality of wheels, and wherein the controller is in functional communication with each actuator of the plurality of actuators to cause each actuator to vary a corresponding application of force.

In some embodiments, the actuator includes at least one actuatable component for controlling the force applied, wherein the at least one actuatable component includes at least one of: a motor, a clutch, and a brake.

In some embodiments, the at least one actuatable component includes each of: the motor, the clutch, and the brake.

In some embodiments, at least one of the clutch and the brake is operable based on changing a viscosity of a magnetorheological (MR) fluid.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors, processor architectures, combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An active suspension control system for a vehicle, comprising:

an unsprung mass coupled to a sprung mass by a spring;

an actuator disposed between the unsprung mass and the sprung mass and configured to apply a force therebetween;

a controller in functional communication with the actuator and configured to cause the actuator to vary the force based on a force command signal, wherein the controller is configured to determine the force command signal based on at least one of: a linear quadratic control technique; or an impedance control technique using a low-pass filtered actual-value signal, wherein the actuator includes at least one actuatable component for controlling the force applied, wherein the at least one actuatable component includes at least one of: a clutch and/or a brake, and wherein the at least one of the clutch and/or the brake is operable based on changing a viscosity of a magnetorheological (MR) fluid.

2. The active suspension control system of claim 1, wherein the controller is configured to determine the force command signal based on the linear quadratic control technique.

3. The active suspension control system of claim 1, wherein the controller is configured to determine the force command signal based on the impedance control technique using the low-pass filtered actual-value signal.

4. The active suspension control system of claim 3, wherein actual-value signal represents a linear distance between the unsprung mass and the sprung mass.

5. The active suspension control system of claim 1, wherein the spring and the actuator are the only physical connections between the sprung mass and the unsprung mass.

6. The active suspension control system of claim 1, wherein the unsprung mass includes a wheel of the vehicle.

7. The active suspension control system of claim 1, wherein the vehicle includes a plurality of wheels, wherein the actuator is one of a plurality of actuators, with each actuator of the plurality of actuators being coupled to a corresponding wheel of the plurality of wheels, and wherein the controller is in functional communication with each actuator of the plurality of actuators to cause each actuator to vary a corresponding application of force.

8. The active suspension control system of claim 1, wherein the at least one actuatable component further includes a motor.

9. The active suspension control system of claim 8, wherein the at least one actuatable component includes each of: the motor, the clutch, and the brake.

10. A method for controlling an active suspension control system for a vehicle, comprising:

applying a force, by an actuator, between an unsprung mass and a sprung mass, wherein the unsprung mass is coupled to the sprung mass by a spring;

determining, by a controller, a force command signal based on at least one of: a linear quadratic control technique, or an impedance control technique using a low-pass filtered actual-value signal; and communicating, the force command signal to the actuator to cause the actuator to vary the force, wherein the actuator includes at least one actuatable component for controlling the force applied, wherein the at least one actuatable component includes at least one of: a clutch and/or a brake, and wherein the at least one of the clutch and/or the brake is operable based on changing a viscosity of a magneto-rheological (MR) fluid.

11. The method of claim 10, wherein the controller is configured to determine the force command signal based on the linear quadratic control technique.

12. The method of claim 10, wherein the controller is configured to determine the force command signal based on the impedance control technique using the low-pass filtered actual-value signal.

13. The method of claim 12, wherein actual-value signal represents a linear distance between the unsprung mass and the sprung mass.

14. The method of claim 10, wherein the spring and the actuator are the only physical connections between the sprung mass and the unsprung mass.

15. The method of claim 10, wherein the unsprung mass includes a wheel of the vehicle.

16. The method of claim 10, wherein the vehicle includes a plurality of wheels, wherein the actuator is one of a plurality of actuators, with each actuator of the plurality of actuators being coupled to a corresponding wheel of the plurality of wheels, and wherein the controller is in functional communication with each actuator of the plurality of actuators to cause each actuator to vary a corresponding application of force.

17. The method of claim 10, wherein the at least one actuatable component further includes a motor.

18. The method of claim 17, wherein the at least one actuatable component includes each of: the motor, the clutch, and the brake.

* * * * *